(12) United States Patent
Wolf

(10) Patent No.: US 7,863,866 B2
(45) Date of Patent: Jan. 4, 2011

(54) ACTIVATING BATTERIES BASED ON ENVIRONMENTAL CONDITIONS

(75) Inventor: Mats Wolf, Sodra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 607 days.

(21) Appl. No.: 11/877,270

(22) Filed: Oct. 23, 2007

(65) Prior Publication Data

US 2009/0102290 A1    Apr. 23, 2009

(51) Int. Cl.
*H01M 10/44* (2006.01)
*H01M 10/46* (2006.01)

(52) U.S. Cl. .................................................... 320/150

(58) Field of Classification Search ........... 320/103, 320/107, 114, 115, 116, 128, 150, 153; 324/426, 324/430, 431
See application file for complete search history.

(56) References Cited

U.S. PATENT DOCUMENTS

| | | | |
|---|---|---|---|
| 5,422,558 A | 6/1995 | Stewart | |
| 5,440,221 A * | 8/1995 | Landau et al. | 320/155 |
| 5,973,476 A | 10/1999 | Irvin | |
| 6,818,356 B1 | 11/2004 | Bates | |
| 2003/0167415 A1 | 9/2003 | Odaohhara et al. | |
| 2005/0202310 A1* | 9/2005 | Yahnker et al. | 429/62 |

OTHER PUBLICATIONS

Notification of Transmittal of the International Search Report and the Written Opinion of the International Searching Authority, or the Declaration corresponding to PCT/IB2008/051531, dated Jun. 3, 2009, 12 pages.

* cited by examiner

*Primary Examiner*—Edward Tso
(74) *Attorney, Agent, or Firm*—Harrity & Harrity, LLP

(57) ABSTRACT

A system measures a temperature condition of a component of a mobile communication device, determines a battery of the mobile communication device based on the measured temperature condition, activates the determined battery, activates a temperature management device connected to the battery, and manages the measured temperature condition of the component with the temperature management device.

17 Claims, 8 Drawing Sheets

ACTIVATING BATTERIES BASED ON ENVIRONMENTAL CONDITIONS

BACKGROUND

Consumer electronic devices (e.g., cell phones, laptop computers, etc.) operate in and/or are exposed to a wide temperature range that may be outside a temperature specified for batteries powering the devices. For example, in some situations, the devices may be exposed to extreme conditions (e.g., very low temperatures). In another example, components within the devices may become very hot in use, which may strain design and/or thermal management of the devices.

Standard batteries powering such consumer electronic devices are not typically suitable for use under such extreme conditions (e.g., very high temperatures and/or very low temperatures). For example, high temperatures (e.g., "hot spots") may lead to temperature gradients over the batteries that may degrade long term performance of the batteries (e.g., it may shorten a calendar life of the batteries).

SUMMARY

According to one aspect, a method may include measuring a temperature condition of a component of a mobile communication device, determining a battery of the mobile communication device based on the measured temperature condition, and activating the determined battery.

Additionally, the determining a battery of the mobile communication device may include at least one of determining whether the measured temperature condition is below a cold temperature threshold, or determining whether the measured temperature condition is above a hot temperature threshold.

Additionally, the method may include activating a temperature management device connected to the battery, and managing the measured temperature condition of the component with the temperature management device.

Additionally, the managing the measured temperature condition may include at least one of heating the component with the temperature management device if the measured temperature condition is below a cold temperature threshold, or cooling the component with the temperature management device if the measured temperature condition is above a hot temperature threshold.

Additionally, the determining a battery may include determining the battery from multiple batteries with overlapping temperature ranges based on the measured temperature condition.

Additionally, the activating the determined battery may include at least one of activating a battery operable under cold temperature conditions if the measured temperature condition is below a cold temperature threshold, or activating a battery operable under hot temperature conditions if the measured temperature condition is above a hot temperature threshold.

Additionally, the method may include at least one of activating a first temperature management device to heat the component if the measured temperature condition is below a cold temperature threshold, or activating a second temperature management device to cool the component if the measured temperature condition is above a hot temperature threshold.

According to another aspect, a mobile communication device may include multiple batteries, a temperature monitoring device that measures a temperature condition of the mobile communication device or a component of the mobile communication device, and processing logic configured to receive the measured temperature condition from the temperature monitoring device, select a battery from the multiple batteries based on the measured temperature condition, and activate the selected battery.

Additionally, one or more of the multiple batteries may include one of a lithium-ion battery, a lithium-polymer battery, lithium-polymer battery using solid state polymer electrolytes, a lithium-ion battery designed for low temperature operation, or a thin film solid state battery.

Additionally, the temperature monitoring device may include one of a thermometer, a thermocouple, a thermistor, or a resistance temperature detector (RTD).

Additionally, the processing logic may be further configured to at least one of determine whether the measured temperature condition is below a cold temperature threshold, or determine whether the measured temperature condition is above a hot temperature threshold.

Additionally, the mobile communication device may include a temperature management device connected to the selected battery, where activation of the selected battery causes the temperature management device to be activated, and the temperature management device manages the measured temperature condition of the mobile communication device or the component in response to being activated.

Additionally, the temperature management device may include one of a resistor, a field effect transistor (FET), a heating element, a fan, or a Peltier element.

Additionally, the processing logic may be further configured to at least one of determine whether the measured temperature condition is below a cold temperature threshold, or determine whether the measured temperature condition is above a hot temperature threshold, and the temperature management device may at least one of heat the mobile communication device or the component if the measured temperature condition is determined to be below the cold temperature threshold, or cool the mobile communication device or the component if the measured temperature condition is determined to be above the hot temperature threshold.

Additionally, the multiple batteries may include batteries with overlapping temperature ranges.

Additionally, the selected battery may include a temperature range comprising the measured temperature condition.

Additionally, when selecting a battery, the processing logic may be further configured to at least one of select, from the multiple batteries, a battery operable under cold temperature conditions if the measured temperature condition is below a cold temperature threshold, or select, from the multiple batteries, a battery operable under hot temperature conditions if the measured temperature condition is above a hot temperature threshold.

Additionally, the mobile communication device may include a first temperature management device, and a second temperature management device, and the processing logic may be further configured to at least one of activate the first temperature management device, via the selected battery, to heat the mobile communication device or the component if the measured temperature condition is below a cold temperature threshold, or activate the second temperature management device, via the selected battery, to cool the mobile communication device or the component if the measured temperature condition is above a hot temperature threshold.

Additionally, the first temperature management device may include one of a resistor, a field effect transistor (FET), or a heating element, and the second temperature management device may include one of a fan or a Peltier element.

According to yet another aspect, a system may include means for measuring a condition of a component of a mobile communication device, means for determining a battery from multiple batteries of the mobile communication device based on the measured condition, means for activating the determined battery, means for activating a condition management device connected to the determined battery, and means for managing the measured condition of the component with the condition management device.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein may provide systems and/or methods for activating one or more batteries of a user device based on one or more measured conditions of the user device. For example, in one implementation, a temperature of the user device and/or a component of the user device may be measured, and/or one or more batteries (e.g., batteries that may be used in extreme temperature (heat or cold) conditions) may be determined based on the measured temperature. The determined one or more batteries may be activated and/or may provide a better resistance to the measured temperature. In another example, one or more batteries (e.g., batteries dedicated for thermal management of the user device) may be determined based on the measured temperature, and/or may be activated. The determined one or more batteries may activate corresponding management devices (e.g., thermal management devices), and/or the corresponding management devices may manage (e.g., control the temperature) the user device and/or the component of the user device.

Exemplary User Device Configuration

Figure 1:
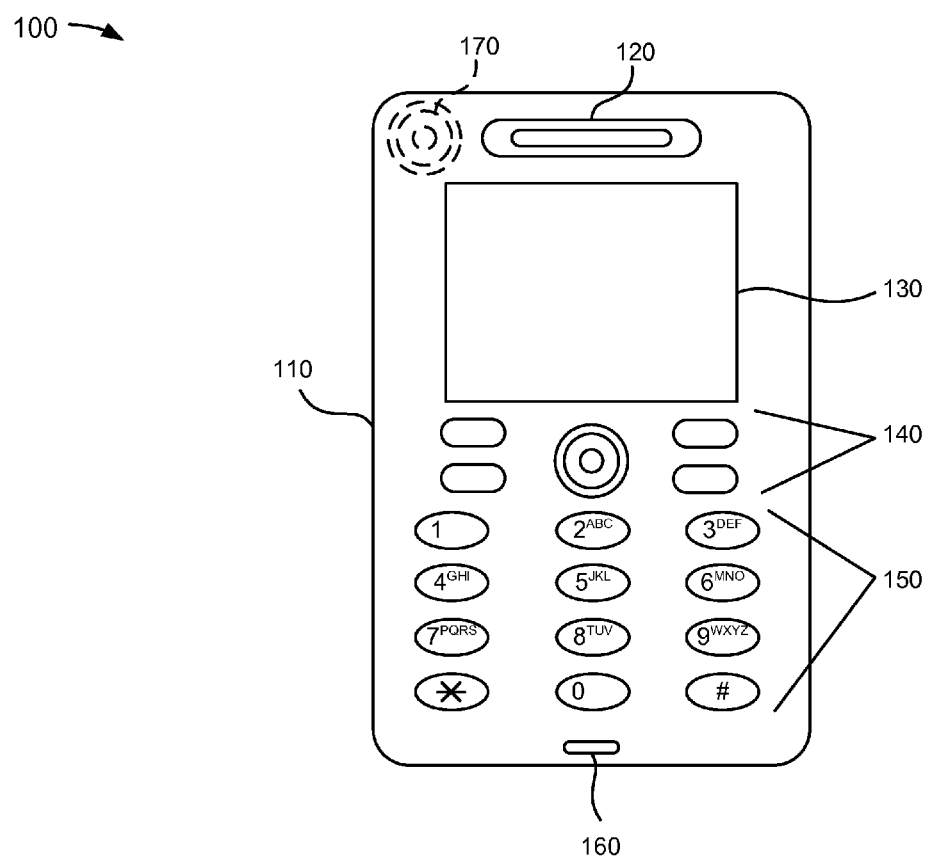
FIG. 1 is an exemplary diagram of a user device in which systems and methods described herein may be implemented.

FIG. 1 is an exemplary diagram of a user device 100 in which systems and methods described herein may be implemented. User device 100 may include any device capable of using one or more batteries for managing one or more components of user device 100. For example, user device 100 may include a mobile communication device (e.g., a radiotelephone, a personal communications system (PCS) terminal that may combine a cellular radiotelephone with data processing, a facsimile, and data communications capabilities, a personal digital assistant (PDA) that can include a radiotelephone, pager, Internet/intranet access, web browser, organizer, calendar, a Doppler receiver, and/or global positioning system (GPS) receiver, a GPS device, a telephone, a cellular phone, etc.); a lap top computer; a personal computer; or another type of computation or communication device; a thread or process running on one of these devices; and/or an object executable by one of these devices.

In one implementation, as shown in FIG. 1, user device 100 may include a housing 110, a speaker 120, a display 130, control buttons 140, a keypad 150, a microphone 160, and/or a camera 170. Housing 110 may protect the components of user device 100 from outside elements. Speaker 120 may provide audible information to a user of user device 100.

Display 130 may provide visual information to the user. For example, display 130 may display text input into user device 100, text, images, video, and/or graphics received from another device, and/or information regarding incoming or outgoing calls or text messages, emails, media, games, phone books, address books, the current time, etc. Control buttons 140 may permit the user to interact with user device 100 to cause user device 100 to perform one or more operations. For example, control buttons 140 may be used to cause user device 100 to transmit information. Keypad 150 may include a standard telephone keypad. Microphone 160 may receive audible information from the user. Camera 170 may be provided on a back side of user device 100, and may enable user device 100 to capture and/or store video and/or images (e.g., pictures).

Although FIG. 1 shows exemplary components of user device 100, in other implementations, user device 100 may contain fewer, different, or additional components than depicted in FIG. 1. In still other implementations, one or more components of user device 100 may perform one or more other tasks described as being performed by one or more other components of user device 100.

Figure 2:
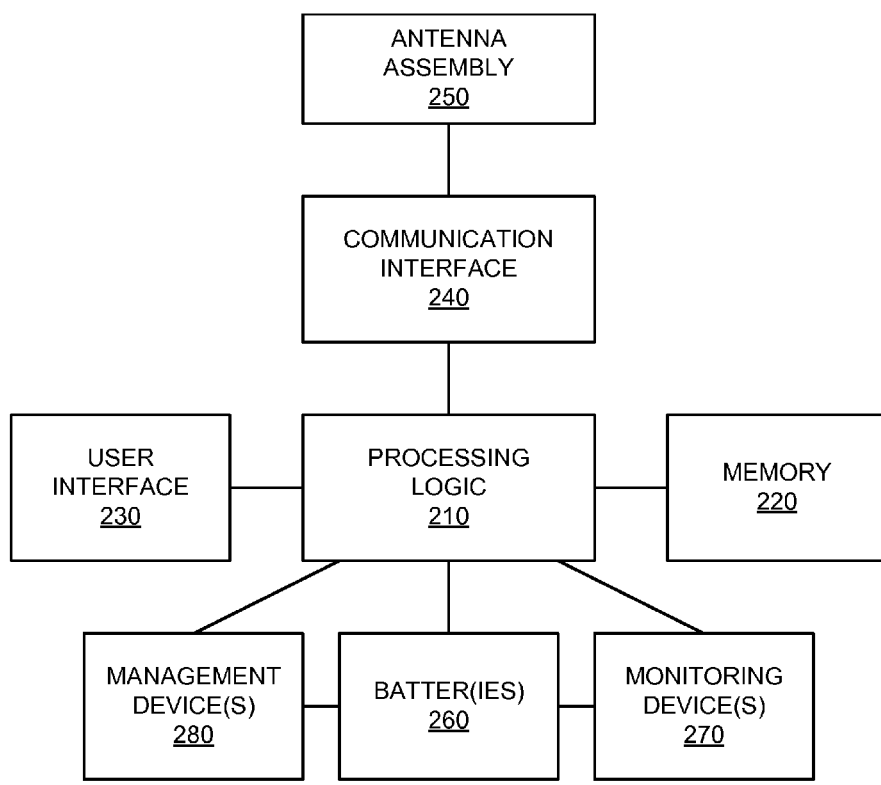
FIG. 2 is a diagram of exemplary components of the user device of FIG. 1.

FIG. 2 is a diagram of exemplary components of user device 100. As illustrated, user device 100 may include processing logic 210, memory 220, a user interface 230, a communication interface 240, an antenna assembly 250, one or more batter(ies) 260, one or more monitoring devices 270, and/or one or more management devices 280.

Processing logic 210 may include a processor, a microprocessor, an application specific integrated circuit (ASIC), a field programmable gate array (FPGA), or the like. Processing logic 210 may control operation of user device 100 and its components. In one implementation, processing logic 210 may control operation of components of user device 100 in a manner described herein.

Memory 220 may include a random access memory (RAM), a read-only memory (ROM), and/or another type of memory to store data and instructions that may be used by processing logic 210.

User interface 230 may include mechanisms for inputting information to user device 100 and/or for outputting information from user device 100. Examples of input and output mechanisms might include buttons (e.g., control buttons 140, keys of keypad 150, a joystick, etc.) or a touch screen interface to permit data and control commands to be input into user device 100; a speaker (e.g., speaker 120) to receive electrical signals and output audio signals; a microphone (e.g., microphone 160) to receive audio signals and output electrical signals; a display (e.g., display 130) to output visual information (e.g., text input into user device 100); a vibrator to cause user device 100 to vibrate; and/or a camera (e.g., camera 170) to receive video and/or images.

Communication interface 240 may include, for example, a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network and/or devices connected to a network.

Each of batter(ies) 260 may include any battery that has a membrane (e.g., a separator) separating positive and negative electrodes (e.g., a lithium-ion battery, a lithium-polymer battery, lithium-polymer battery using solid state polymer electrolytes, a lithium-ion battery designed for low temperature operation, etc.), any thin film solid state battery, any battery capable of being used in user device 100 (as defined above) under normal conditions and/or extreme conditions (e.g., excessive heat or excessive cold), etc. Each of batter(ies) 260 may include a variety of shapes and sizes, depending on the shape and size of user device 100, the amount of power required by user device 100, etc.

Monitoring device(s) 270 may include any device capable of monitoring conditions of user device 100, one or more components of user device 100, and/or conditions that may affect performance of user device 100 and/or one or more components of user device 100. For example, in one implementation, monitoring device(s) 270 may include a voltage monitoring device (e.g., a voltage sensor, such as an analog-to-digital (A/D) converter provided within user device 100), a temperature monitoring device (e.g., a thermistor, a thermocouple, etc.), and/or a drop monitoring device (e.g., an accelerometer, etc.). In another implementation, monitoring device(s) 270 may be incorporated within one or more batter(ies) 260. In other implementations, monitoring device(s) 270 may be provided adjacent to one or more components of user device 100. Further details of monitoring device(s) 270 are provided below in connection with FIG. 4.

Management device(s) 280 may include any device capable of managing conditions of user device 100 and/or one or more components of user device 100. For example, in one implementation, management device(s) 280 may include a heating device (e.g., a resistor, a field effect transistor (FET), a heating element, etc.) that may heat user device 100 and/or one or more components of user device 100, a cooling device (e.g., a fan, a Peltier element, etc.) that may cool user device 100 and/or one or more components of user device 100, etc. In another implementation, management device(s) 280 may be powered by batter(ies) 260 based on the condition(s) of user device 100 and/or one or more components of user device 100 (e.g., as monitored by monitoring device(s) 270). In other implementations, management device(s) 280 and/or corresponding batter(ies) 260 may be provided adjacent to one or more components of user device 100 in order to manage condition(s) (e.g., heating and/or cooling conditions) of the one or more components.

As will be described in detail below, user device 100 may perform certain operations described herein in response to processing logic 210 executing software instructions of an application contained in a computer-readable medium, such as memory 220. A computer-readable medium may be defined as a physical or logical memory device. The software instructions may be read into memory 220 from another computer-readable medium or from another device via communication interface 240. The software instructions contained in memory 220 may cause processing logic 210 to perform processes that will be described later. Alternatively, hard-wired circuitry may be used in place of or in combination with software instructions to implement processes described herein. Thus, implementations described herein are not limited to any specific combination of hardware circuitry and software.

Although FIG. 2 shows exemplary components of user device 100, in other implementations, user device 100 may contain fewer, different, or additional components than depicted in FIG. 2. In still other implementations, one or more components of user device 100 may perform one or more other tasks described as being performed by one or more other components of user device 100.

Exemplary Arrangements of User Device Components

Figure 3A:
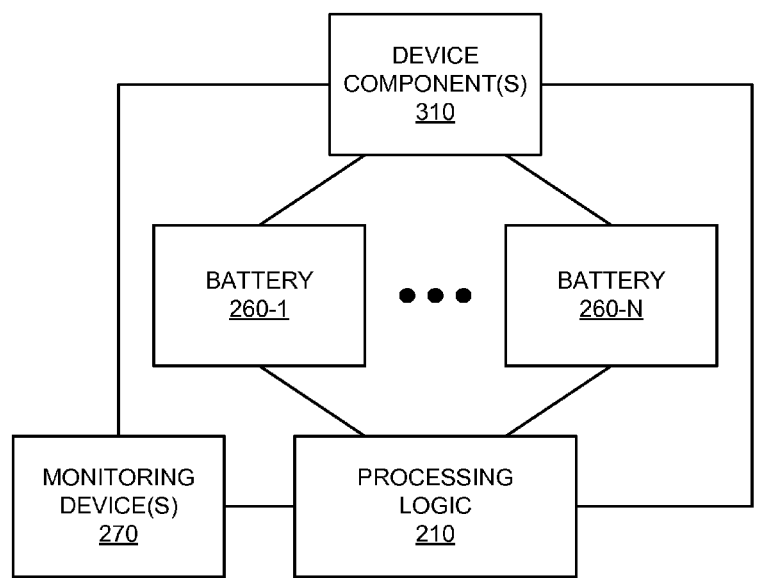
FIGS. 3A and 3B are diagrams of exemplary arrangements of components of the user device depicted in FIGS. 1 and 2.
Figure 3B:
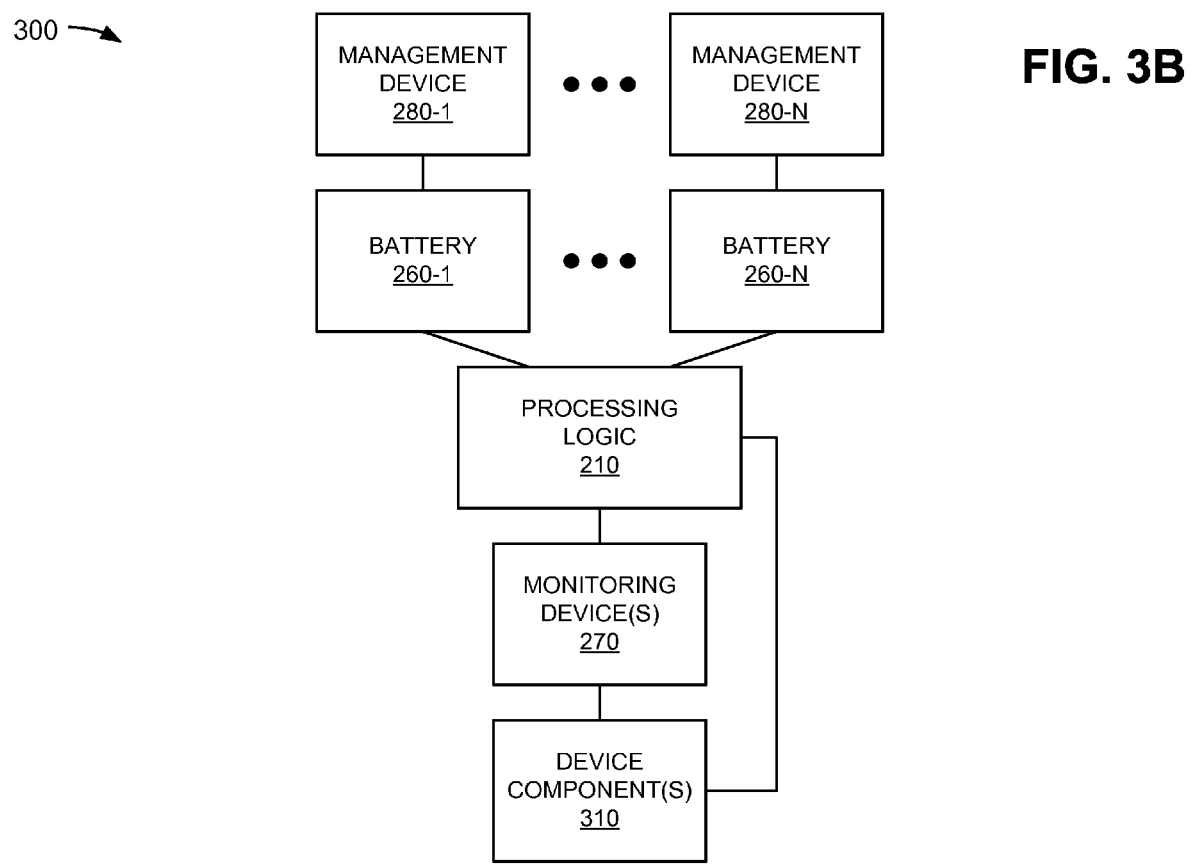

FIGS. 3A and 3B are diagrams of exemplary arrangements 300 of components of user device 100. As illustrated in FIG. 3A, processing logic 210 may communicate with batteries 260-1, ..., 260-N (collectively referred to as "batteries 260") monitoring device(s) 270, and/or device component(s) 310. Batteries 260-1, ..., 260-N may include the features described above in connection with batter(ies) 260 shown in FIG. 2. Device component(s) 310 may include any component (or combination of components) included in user device 100 (e.g., circuits, memory 220, user interface 230, communication interface 240, antenna assembly 250, etc.). In one implementation, batteries 260 may be included in device component(s) 310. Arrangement 300 depicted in FIG. 3A may permit certain batteries 260 to energize device component(s) 310 based on one or more conditions measured by monitoring device(s) 270.

In one implementation, monitoring device(s) 270 may measure one or more conditions (e.g., a temperature) of one or more of device component(s) 310, and/or may provide the measured one or more conditions to processing logic 210. Processing logic 210 may determine whether the measured one or more conditions is below or above a threshold. For example, processing logic 210 may determine whether a measured temperature of one of device component(s) 310 is below a low temperature threshold (e.g., dependent on user device 100) or above a high temperature threshold (e.g., dependent on user device 100). If processing logic 210 determines that the measured condition of one of device component(s) 310 is below or above the threshold, processing logic 210 may instruct activation of one or more of batteries 260 based on the measured condition. For example, batteries 260 may include batteries with certain operating temperature ranges (e.g., batteries with overlapping operating temperature ranges). Processing logic 210 may select one or more of batteries 260 (e.g., one or more of batteries 260 with an operating temperature range that contains the measured temperature) for activation based on the measured temperature. Such overlapping operating temperature ranges may increase a temperature window of operation for device component(s) 310 and/or user device 100. Batteries 260 that receive instructions for activation from processing logic 210 may be activated for energizing one or more of device component(s) 310 of user device 100. In one example, a low-temperature battery (e.g., one of batteries 260) may be used as a main battery in extreme cold conditions.

As shown in FIG. 3B, processing logic 210 may communicate with batteries 260-1, ..., 260-N (collectively referred to as "batteries 260") monitoring device(s) 270, and/or device component(s) 310. One or more of batteries 260 may connect to a corresponding management device 280-1, . . . , 280-N (collectively referred to as "management devices 280"). Management devices 280-1, . . . , 280-N may include the features described above in connection with management device(s) 280 shown in FIG. 2. Arrangement 300 depicted in FIG. 3B may permit certain batteries 260 to energize one or more management devices 280 based on one or more conditions measured by monitoring device(s) 270.

In one implementation, monitoring device(s) 270 may measure one or more conditions (e.g., a temperature) of one or more of device component(s) 310, and/or may provide the measured one or more conditions to processing logic 210. Processing logic 210 may determine whether the measured one or more conditions is below or above a threshold. For example, processing logic 210 may determine whether a measured temperature of one of device component(s) 310 is below a low temperature threshold (e.g., a threshold that may depend on user device 100) or above a high temperature threshold (e.g., a threshold that may depend on user device 100). If processing logic 210 determines that a measured condition of one of device component(s) 310 is below or above the threshold, processing logic 210 may instruct activation of one or more of batteries 260 based on the measured condition. Batteries 260 that receive instructions for activation from processing logic 210 may be activated for energizing and/or activating one or more of management devices 280. The activated management devices 280 may manage the one or more conditions of device component(s) 310.

For example, management device(s) 280 may be thermal management devices and may be used for active thermal management (e.g., heating in cold temperature conditions, or cooling in hot temperature conditions) of device component(s) 310 and/or user device 100. In another example, a low-temperature battery (e.g., one of batteries 260) may be used in conjunction with one of management device(s) 280 (e.g., a heating element) to heat a standard-temperature battery. In still another example, management devices 280 (e.g., a cooling device) may be used to cool a battery (e.g., one of batter(ies) 260) that is at too high of a temperature or is overheating in order to reduce a safety hazard.

Although FIGS. 3A and 3B show exemplary components and component arrangements of user device 100, in other implementations, user device 100 may contain fewer, different, or additional components and/or arrangements than depicted in FIGS. 3A and 3B. In still other implementations, one or more components of user device 100 may perform one or more other tasks described as being performed by one or more other components of user device 100.

Exemplary Monitoring Devices

Figure 4:
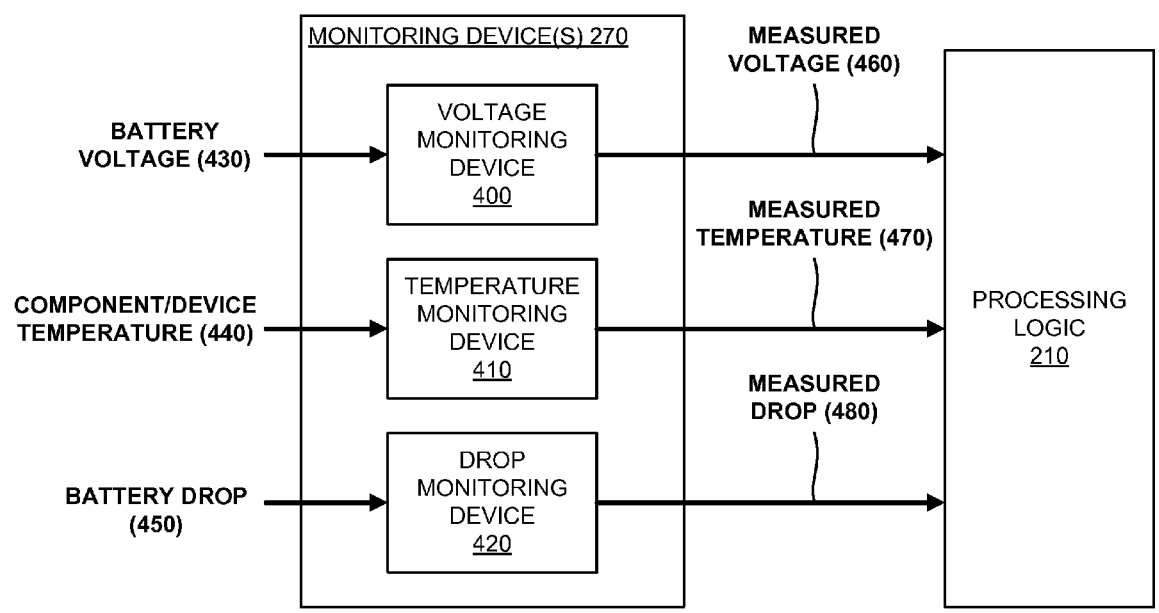
FIG. 4 is a diagram of exemplary monitoring devices of the user device depicted in FIGS. 1 and 2.

FIG. 4 is an exemplary diagram of monitoring device(s) 270. As illustrated, monitoring device(s) 270 may include a voltage monitoring device 400, a temperature monitoring device 410, and/or a drop monitoring device 420.

Voltage monitoring device 400 may include any device capable of measuring voltages of one or more of batter(ies) 260. For example, in one implementation, voltage monitoring device 400 may include a voltmeter, a potentiometer, an A/D converter provided within user device 100, etc. In other implementations, voltage monitoring device 400 may include other components of user device 100 that are capable of measuring voltage of battery 260, such as processing logic 210. As further shown in FIG. 4, voltage monitoring device 400 may measure a battery voltage 430, and may output a measured voltage 460 to processing logic 210. Processing logic 210 may utilize measured voltage 460 to activate one or more of batter(ies) 260 that may be dedicated for managing conditions of user device 100. For example, if a decrease in measured voltage 460 indicates that user device 100 and/or one or more of device component(s) 310 are overheating, processing logic 210 may activate one or more of management device(s) 280 (e.g., via activation of one or more of batter(ies) 260) to cool user device 100 and/or one or more of device component(s) 310.

Temperature monitoring device 410 may include any device capable of measuring temperatures of one or more components of user device 100 (e.g., batter(ies) 260, device component(s) 310, etc.) and/or user device 100. For example, in one implementation, temperature monitoring device 410 may include a thermometer, a thermocouple, a thermistor, a resistance temperature detector (RTD), etc. As further shown in FIG. 4, temperature monitoring device 410 may measure a temperature 440 of one or more components of user device 100 (or a temperature of user device 100), and may output a measured temperature 470 to processing logic 210. Processing logic 210 may utilize measured temperature 470 to activate one or more of batter(ies) 260 that may be dedicated for managing conditions (e.g., temperatures) of user device 100. For example, if an increase in measured temperature 470 indicates that user device 100 and/or one or more of device component(s) 310 are overheating, processing logic 210 may activate one or more of management device(s) 280 (e.g., via activation of one or more of batter(ies) 260) to cool user device 100 and/or one or more of device component(s) 310.

Drop monitoring device 420 may include any device capable of measuring various mechanical conditions (e.g., dropping, shaking, striking, etc.) of one or more of batter(ies) 260 and/or user device 100. For example, in one implementation, drop monitoring device 420 may include an accelerometer, a Doppler receiver, a GPS receiver, etc. As further shown in FIG. 4, drop monitoring device 420 may measure a battery drop 450 (or a drop of user device 100), and may output a measured drop 480 to processing logic 210. Processing logic 210 may utilize measured drop 480 to activate one or more of batter(ies) 260 that may be dedicated for managing conditions of user device 100. For example, if a value of measured drop 480 indicates that user device 100 and/or one or more of device component(s) 310 are damaged and overheating, processing logic 210 may activate one or more of management device(s) 280 (e.g., via activation of one or more of batter(ies) 260) to cool user device 100 and/or one or more of device component(s) 310.

Although FIG. 4 shows exemplary components of monitoring device(s) 270, in other implementations, monitoring device(s) 270 may contain fewer, different, or additional components than depicted in FIG. 4. In still other implementations, one or more components of monitoring device(s) 270 may perform one or more other tasks described as being performed by one or more other components of monitoring device(s) 270.

Exemplary Processes

Figure 5:
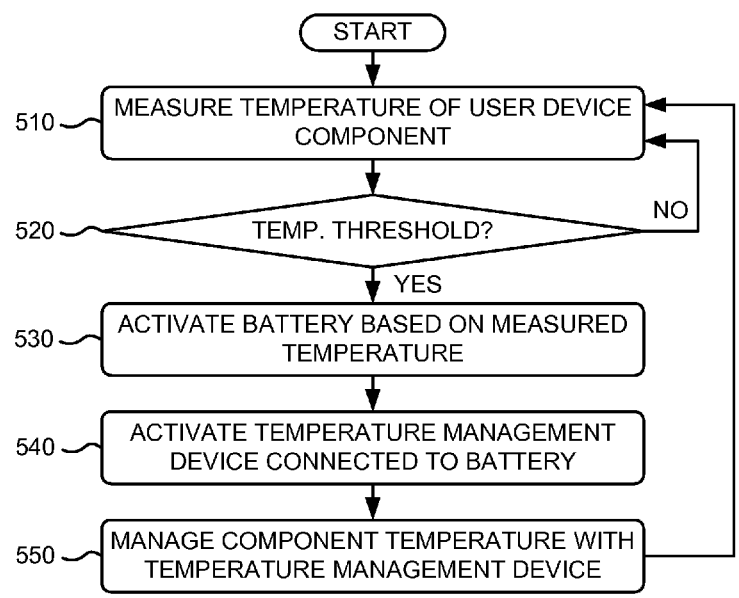
FIGS. 5-7 depict flow charts of exemplary processes according to implementations described herein.

FIG. 5 depicts a flow chart of an exemplary process 500 for providing thermal management of user device 100. In one implementation, process 500 may be performed by hardware and/or software components of user device 100 (e.g., processing logic 210). In other implementations, process 500 may be performed by hardware and/or software components of user device 100 (e.g., processing logic 210) in combination with hardware and/or software components of another device (e.g., communicating with user device 100 via communication interface 240).

As illustrated, process 500 may begin with a temperature measurement of a component of a user device (block 510), and/or a determination of whether the measured temperature is below or above a temperature threshold (block 520). For example, in one implementation described above in connection with FIG. 3B, monitoring device(s) 270 of user device 100 may measure one or more conditions (e.g., a temperature, measured voltage 460, measured drop 480, etc.) of one or more of device component(s) 310, and/or may provide the measured one or more conditions to processing logic 210. Processing logic 210 may determine whether the measured one or more conditions is below or above a threshold. In one example, processing logic 210 may determine whether a measured temperature of one of device component(s) 310 is below a low temperature threshold (e.g., a threshold that may depend on user device 100) or above a high temperature threshold (e.g., a threshold that may depend on user device 100). In one implementation, the low temperature threshold and/or the high temperature threshold may be configurable.

Returning to FIG. 5, if the measured temperature is below or above the temperature threshold (block 520—YES), a battery of the user device may be activated (block 530). Otherwise (block 520—NO), process 500 may return to block 510. For example, in one implementation described above in connection with FIG. 3B, if processing logic 210 determines that a measured condition (e.g., a temperature) of one of device component(s) 310 is below or above the threshold (e.g., a temperature threshold), processing logic 210 may instruct activation of one or more of batteries 260 based on the measured condition. Batteries 260 that receive instructions for activation from processing logic 210 may be activated.

As further shown in FIG. 5, a temperature management device connected to the activated battery may be activated (block 540), and/or the temperature management device may manage the temperature of the component of user device (block 550). For example, in one implementation described above in connection with FIG. 3B, activated batteries 260 may energize and/or activate one or more of management devices 280. The activated management devices 280 may manage the one or more conditions of device component(s) 310. In one example, management device(s) 280 may be thermal management devices and may be used for active thermal management (e.g., heating in cold temperature conditions, or cooling in hot temperature conditions) of device component(s) 310 and/or user device 100. In another example, a low-temperature battery (e.g., one of batteries 260) may be used in conjunction with one of management devices 280 (e.g., a heating element) to heat a standard-temperature battery.

Figure 6:
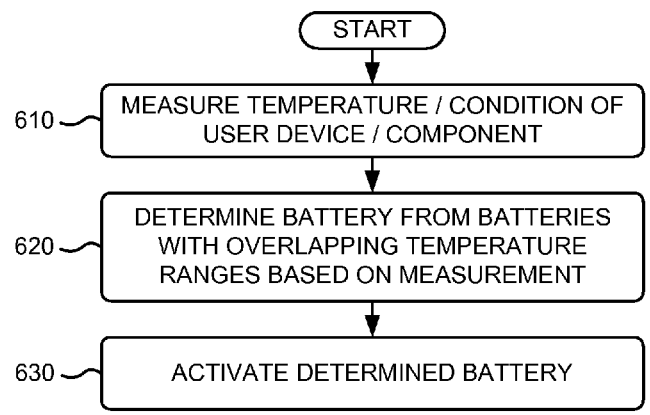

FIG. 6 depicts a flow chart of an exemplary process 600 for activating one of batteries 260 of user device 100 based on a measured condition (e.g., a temperature, measured voltage 460, measured drop 480, etc.). In one implementation, process 600 may be performed by hardware and/or software components of user device 100 (e.g., processing logic 210). In other implementations, process 600 may be performed by hardware and/or software components of user device 100 (e.g., processing logic 210) in combination with hardware and/or software components of another device (e.g., communicating with user device 100 via communication interface 240).

As illustrated, process 600 may begin with measurement of a temperature and/or a condition of a user device and/or a component of the user device (block 610). For example, in one implementation described above in connection with FIG. 3A, monitoring device(s) 270 of user device 100 may measure one or more conditions (e.g., a temperature) of user device 100 and/or one or more of device component(s) 310, and/or may provide the measured one or more conditions to processing logic 210.

Returning to FIG. 6, a battery, from batteries with overlapping temperature ranges, may be determined based on the measured temperature and/or condition (block 620), and/or the determined battery may be activated (block 630). For example, in one implementation described above in connection with FIG. 3A, batteries 260 of user device 100 may include batteries with certain operating temperature ranges (e.g., batteries with overlapping operating temperature ranges). Processing logic 210 may select one or more of batteries 260 (e.g., one or more of batteries 260 with an operating temperature range that contains the measured temperature) for activation based on the measured temperature. Batteries 260 that receive instructions for activation from processing logic 210 may be activated for energizing one or more of device component(s) 310 of user device 100. In one example, a low-temperature battery (e.g., one of batteries 260) may be used as a main battery in extreme cold conditions.

Figure 7:
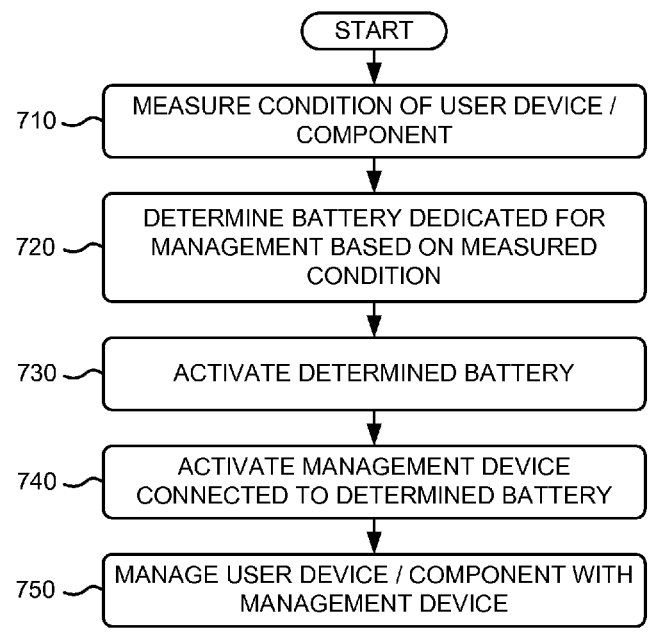

FIG. 7 depicts a flow chart of an exemplary process 700 for managing a condition of user device 100 via activation of batteries 260 of user device 100. In one implementation, process 700 may be performed by hardware and/or software components of user device 100 (e.g., processing logic 210). In other implementations, process 700 may be performed by hardware and/or software components of user device 100 (e.g., processing logic 210) in combination with hardware and/or software components of another device (e.g., communicating with user device 100 via communication interface 240).

As illustrated, process 700 may begin with a measurement of a condition of a user device and/or a component of the user device (block 710), and/or a determination of a battery dedicated for management based on the measured condition (block 720). For example, in one implementation described above in connection with FIG. 3B, monitoring device(s) 270 of user device 100 may measure one or more conditions (e.g., a temperature, measured voltage 460, measured drop 480, etc.) of user device 100 and/or one or more of device component(s) 310, and/or may provide the measured one or more conditions to processing logic 210. Processing logic 210 may select one or more of batteries 260 (e.g., one or more of batteries 260 dedicated for management of user device 100) for activation based on the measured one or more conditions.

Returning to FIG. 7, the determined battery may be activated (block 730), and/or a management device connected to the determined battery may be activated (block 740). For example, in one implementation described above in connection with FIG. 3B, batteries 260 that receive instructions for activation from processing logic 210 may be activated for energizing and/or activating one or more of management devices 280.

As further shown in FIG. 7, the activated management device may manage the user device and/or the component of the user device (block 750). For example, in one implementation described above in connection with FIG. 3B, the activated management devices 280 may manage the one or more conditions of user device 100 and/or device component(s) 310. In one example, management device(s) 280 may be thermal management devices and may be used for active thermal management (e.g., heating in cold temperature conditions, or cooling in hot temperature conditions) of user device 100 and/or device component(s) 310. In another example, a low-temperature battery (e.g., one of batteries 260) may be used in conjunction with one of management devices 280 (e.g., a heating element) to heat a standard-temperature battery.

CONCLUSION

Implementations described herein may provide systems and/or methods for activating one or more batteries of a user device based on one or more measured conditions of the user device. For example, in one implementation, a temperature of the user device and/or a component of the user device may be measured, and/or one or more batteries (e.g., batteries that may be used in extreme temperature (heat or cold) conditions) may be determined based on the measured temperature. The determined one or more batteries may be activated and/or may provide a better resistance to the measured temperature. In another example, one or more batteries (e.g., batteries dedicated for thermal management of the user device) may be determined based on the measured temperature, and/or may be activated. The determined one or more batteries may activate corresponding management devices (e.g., thermal management devices), and/or the corresponding management devices may manage (e.g., control the temperature) the user device and/or the component of the user device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5-7, the order of the blocks may be modified in other implementations. Further, non-dependent blocks may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   measuring a temperature condition of a component of a mobile communication device;
   determining a battery of the mobile communication device based on the measured temperature condition, where the determining further comprises:
   determining, from a plurality of batteries, a battery operable under cold temperature conditions if the measured temperature condition is below a cold temperature threshold, or
   determining, from the plurality of batteries, a battery operable under hot temperature conditions if the measured temperature condition is above a hot temperature threshold; and
   activating the determined battery.

2. The method of claim 1, further comprising:
   activating a temperature management device connected to the battery; and
   managing the measured temperature condition of the component with the temperature management device.

3. The method of claim 2, where managing the measured temperature condition comprises:
   heating the component with the temperature management device if the measured temperature condition is below the cold temperature threshold; or
   cooling the component with the temperature management device if the measured temperature condition is above the hot temperature threshold.

4. The method of claim 1, where determining the battery further comprises:
   determining the battery from the plurality of batteries with overlapping temperature ranges based on the measured temperature condition.

5. The method of claim 1, further comprising:
   activating a first temperature management device to heat the component if the measured temperature condition is below the cold temperature threshold; or
   activating a second temperature management device to cool the component if the measured temperature condition is above the hot temperature threshold.

6. A mobile communication device, comprising:
   a plurality of batteries;
   a temperature monitoring device that measures a temperature condition of the mobile communication device or a component of the mobile communication device; and
   processing logic to:
   receive the measured temperature condition from the temperature monitoring device,
   select a battery, from the plurality of batteries, based on the measured temperature condition, where the selection further comprises:
   select, from the plurality of batteries, a battery operable under cold temperature conditions when the measured temperature condition is below a cold temperature threshold, and
   select, from the plurality of batteries, a battery operable under hot temperature conditions when the measured temperature condition is above a hot temperature threshold, and
   activate the selected battery.

7. The mobile communication device of claim 6, where one or more of the plurality of batteries includes one of a lithium-ion battery, a lithium-polymer battery, lithium-polymer battery using solid state polymer electrolytes, a lithium-ion battery designed for low temperature operation, or a thin film solid state battery.

8. The mobile communication device of claim 6, where the temperature monitoring device includes one of:
   a thermometer;
   a thermocouple;

a thermistor; or a resistance temperature detector (RTD).

9. The mobile communication device of claim 6, where the processing logic is further to:

determine whether the measured temperature condition is below the cold temperature threshold; or determine whether the measured temperature condition is above the hot temperature threshold.

10. The mobile communication device of claim 6, further comprising:

a temperature management device connected to the selected battery, where activation of the selected battery causes the temperature management device to be activated, and the temperature management device manages the measured temperature condition of the mobile communication device or the component in response to being activated.

11. The mobile communication device of claim 10, where the temperature management device includes one of:

a resistor;

a field effect transistor (FET);

a heating element;

a fan; or a Peltier element.

12. The mobile communication device of claim 10, where the processing logic is further to:

determine whether the measured temperature condition is below the cold temperature threshold; and determine whether the measured temperature condition is above the hot temperature threshold; and where the temperature management device, when managing the measured temperature condition, is further to:

heat the mobile communication device or the component when the measured temperature condition is determined to be below the cold temperature threshold, or cool the mobile communication device or the component when the measured temperature condition is determined to be above the hot temperature threshold.

13. The mobile communication device of claim 6, where the plurality of batteries comprises batteries are associated with overlapping temperature ranges.

14. The mobile communication device of claim 13, where the selected battery is associated with a temperature range, of the overlapping temperature ranges, comprising the measured temperature condition.

15. The mobile communication device of claim 6, further comprising:

a first temperature management device; and a second temperature management device, where the processing logic is further to:

activate the first temperature management device, via the selected battery, to heat the mobile communication device or the component if the measured temperature condition is below the cold temperature threshold; and activate the second temperature management device, via the selected battery, to cool the mobile communication device or the component if the measured temperature condition is above the hot temperature threshold.

16. The mobile communication device of claim 15, where the first temperature management device comprises one of a resistor, a field effect transistor (FET), or a heating element, and the second temperature management device comprises one of a fan or a Peltier element.

17. A system, comprising:

means for measuring a condition of a component of a mobile communication device;

means for determining a battery from a plurality of batteries of the mobile communication device based on the measured condition, where the means for determining further comprises:

means for selecting, from the plurality of batteries, a battery operable under cold temperature conditions if the measured condition is a temperature that is below a cold temperature threshold, or means for selecting, from the plurality of batteries, a battery operable under hot temperature conditions if the measured condition is a temperature that is above a hot temperature threshold;

means for activating the determined battery;

means for activating a condition management device associated with the determined battery; and means for managing the measured condition of the component with the condition management device.

* * * * *